(12) United States Patent
Lanier

(10) Patent No.: US 6,400,374 B2
(45) Date of Patent: *Jun. 4, 2002

(54) VIDEO SUPERPOSITION SYSTEM AND METHOD

(75) Inventor: Jaron Lanier, Sausalito, CA (US)

(73) Assignee: Eyematic Interfaces, Inc., Inglewood, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,597

(22) Filed: Sep. 18, 1996

(51) Int. Cl.⁷ .............................................. G06F 15/00
(52) U.S. Cl. .......................................... 345/630; 347/7
(58) Field of Search ................................ 345/7–9, 118, 345/113, 114, 330, 435, 327, 231, 584, 232, 233, 598, 333, 156–158, 630, 473–474, 590

(56) References Cited

U.S. PATENT DOCUMENTS

| | | |
|---|---|---|
| 3,899,848 A | 8/1975 | Bunin |
| 4,200,890 A | 4/1980 | Inaba et al. |
| 4,319,266 A | 3/1982 | Bannister |
| 4,409,618 A | 10/1983 | Inaba et al. |
| 4,872,056 A * | 10/1989 | Hicks et al. ................ 358/183 |
| 4,988,981 A | 1/1991 | Zimmerman et al. |
| 5,060,171 A * | 10/1991 | Steir et al. .................. 364/521 |
| 5,227,985 A | 7/1993 | DeMenthon |
| 5,251,016 A | 10/1993 | Delwiche |
| 5,280,530 A | 1/1994 | Trew et al. |
| 5,313,275 A | 5/1994 | Daly et al. |
| 5,345,313 A | 9/1994 | Blank |
| 5,384,912 A | 1/1995 | Ogrinc et al. |
| 5,394,517 A | 2/1995 | Kalawsky |
| 5,398,075 A | 3/1995 | Freytag et al. |
| 5,423,554 A | 6/1995 | Davis |
| 5,469,536 A | 11/1995 | Blank |
| 5,502,482 A | 3/1996 | Graham |
| 5,513,129 A | 4/1996 | Bolas et al. |
| 5,521,373 A | 5/1996 | Lanier et al. |
| 5,526,022 A * | 6/1996 | Donahue et al. ............ 345/156 |
| 5,534,917 A | 7/1996 | MacDougall |
| 5,563,988 A * | 10/1996 | Maes et al. .................. 395/121 |
| 5,623,587 A * | 4/1997 | Bulman ...................... 395/135 |
| 5,687,306 A * | 11/1997 | Blank .......................... 395/135 |
| 5,880,731 A * | 3/1999 | Liles et al. .................. 345/349 |
| 5,923,791 A * | 7/1999 | Hanna et al. ................ 382/295 |

* cited by examiner

*Primary Examiner*—Steven Saras
*Assistant Examiner*—Amr Awad
(74) *Attorney, Agent, or Firm*—Robroy R. Fawcett

(57) ABSTRACT

A graphic image system comprising a video camera producing a first video signal defining a first image including a foreground object and a background, the foreground object preferably including an image of a human subject having a head with a face; an image position estimating system for identifying a position with respect to said foreground object, e.g., the head, the foreground object having features in constant physical relation to the position; and a computer, responsive to the position estimating system, for defining a mask region separating the foreground object from said background. The computer generates a second video signal including a portion corresponding to the mask region, responsive to said position estimating system, which preferably includes a character having a mask outline. In one embodiment, the mask region of the second video signal is keyed so that the foreground object of the first video signal shows through, with the second video signal having portions which interact with the foreground object. In another embodiment, means, responsive to the position estimating system, for dynamically defining an estimated boundary of the face and for merging the face, as limited by the estimated boundary, within the mask outline of the character. Video and still imaging devices may be flexibly placed in uncontrolled environments, such as in a kiosk in a retail store, with an actual facial image within the uncontrolled environment placed within a computer generated virtual world replacing the existing background and any non-participants.

31 Claims, 5 Drawing Sheets

VIDEO SUPERPOSITION SYSTEM AND METHOD

FIELD OF THE INVENTION

The present invention relates to the field of video superposition devices, and more particularly to multiple image source windowed display generation systems.

BACKGROUND OF THE INVENTION

A known video superposition system, known as "chroma keying" employs a foreground image which is separated from an actual background by detection of a background screen chrominance value. Thus, for example, a person is presented in front of a blue screen. A video processing circuit detects the chrominance level, producing a signal when the key color is detected. This color is generally a deep blue, for two reasons. First, this color is generally uncommon in natural foreground scenes, so that artifacts are minimized. Second, this color represents an extreme, so that a single ended comparator may be used to produce the key signal.

When the key signal occurs, a video source switches a synchronized (genlocked) background video signal to the output. Thus, where the key level in the foreground is not detected, the foreground is output, while where the key color is detected, the background signal is output. This technology is well established, and many variations and modifications exist. U.S. Pat. Nos. 4,200,890 and 4,409,618 relate to digital video effects systems employing a chroma key tracking technique. U.S. Pat. No. 4,319,266 relates to a chroma keying system. U.S. Pat. No. 5,251,016 relates to a chroma keyer with secondary hue selector for reduced artifacts. U.S. Pat. No. 5,313,275 relates to a chroma processor including a look-up table or memory, permitting chroma key operation. U.S. Pat. No. 5,398,075 relates to the use of analog chroma key technology in a computer graphics environment. U.S. Pat. No. 5,469,536 relates to an image editing system including masking capability, which employs a computerized hue analysis of the image to separate a foreground object from the background.

Computer generated graphics are well known, as are live video windows within computer graphics screens. U.S. Pat. No. 3,899,848 relates to the use of a chroma key system for generating animated graphics. U.S. Pat. No. 5,384,912 relates to a computer animated graphics system employing a chroma key superposition technique. U.S. Pat. No. 5,345,313 relates to an image editing system for taking a background and inserting part of an image therein, relying on image analysis of the foreground image. U.S. Pat. No. 5,394,517 relates to a virtual reality, integrated real and virtual environment display system employing chroma key technology to merge the two environments.

A number of spatial position sensor types are known. These include electromagnetic, acoustic, infrared, optical, gyroscopic, accelerometer, electromechanical, and other types. In particular, systems are available from Polhemus and Ascension which accurately measure position and orientation over large areas, using electromagnetic fields.

Rangefinder systems are known, which allow the determination of a distance to an object. Known systems include optical focus zone, optical parallax, infrared, and acoustic methods. Also known are non-contact depth mapping systems which determine a depth profile of an object without physical contact with a surface of the object. U.S. Pat. No. 5,521,373 relates to a position tracking system having a position sensitive radiation detector. U.S. Pat. No. 4,988,981 relates to a glove-type computer input device. U.S. Pat. No. 5,227,985 relates to a computer vision system for position monitoring in three dimensions using non-coplanar light sources attached to a monitored object. U.S. Pat. No. 5,423,554 relates to a virtual reality game method and apparatus employing image chroma analysis for tracking a colored glove as an input to a computer system.

U.S. Pat. No. 5,502,482 relates to a system for deriving a studio camera position and motion from the camera image by image analysis. U.S. Pat. No. 5,513,129 relates to a method and system for controlling a computer-generated virtual environment with audio signals.

SUMMARY OF THE INVENTION

The present invention employs a live video source, a background image source, a mask region generator and an overlay device which merges the foreground with the background image based on the output of the mask region generator. Two classes of mask region generators are provided; first, an "in-band" system is provided which acquires the necessary mask region boundaries based on the foreground image acquisition system, and second an "out-of-band" system which provides a separate sensory input to determine the mask region boundary.

A preferred embodiment of the "in-band" system is a rangefinder system which operates through the video camera system, to distinguish the foreground object in the live video source from its native background based on differences in distance from the camera lens. Thus, rather than relying on an analysis of the image per se to extract the foreground object, this preferred embodiment of the system defines the boundary of the object through its focal plane or parallax.

A preferred embodiment of the "out-of-band" system includes an absolute position and orientation sensor physically associated with the foreground object with a predetermined relationship of the sensor to the desired portion of the foreground object. Thus, where the foreground object is a person, the sensor may be an electromagnetic position sensor mounted centrally on top of the head with the mask region defined by an oval boundary below and in front of the position and orientation sensor.

In a preferred embodiment, the foreground image is a portrait of a person, while the background image is a computer generated image of a figure. A position sensor tracks a head position in the portrait, which is used to estimate a facial area. The image of the facial area is then merged in an anatomically appropriate fashion with the background figure.

The background image is, for example, an animated "character", with a masked facial portion. The live video signal in this case includes, as the foreground image, a face, with the face generally having a defined spatial relation to the position sensor. The masked region of the character is generated, based on the output of the position sensor in an appropriate position, so that the face may be superimposed within the masked region. As seen in the resulting composite video image, the live image of the face is presented within a mask of an animated character, presenting a suitable foundation for a consumer entertainment system. The mask may obscure portions of the face, as desired. Manual inputs or secondary position sensors for the arms or legs of the individual may be used as further control inputs, allowing the user to both control the computer generated animation and to become a part of the resultant image. This system may therefore be incorporated into larger virtual reality systems to allow an increased level of interaction, while minimizing the need for specialized environments.

In practice, it is generally desired to mask a margin of the face so that no portion of the background appears in a composite image. Thus, the actual video background is completely obscured and irrelevant. In order to produce an aesthetically pleasing and natural appearing result, the region around the face is preferably provided with an image which appears as a mask. Thus, the background image may appear as a masked character, with the foreground image as a video image of a face within the mask region. The mask region may be independent of the video image data, or developed based on an image processing algorithm of the video image data. In the later case, where processing latencies are substantial, the composite output may be initially provided as a video image data independent mask which is modified over time, when the image is relatively static, for greater correspondence with the actual image. Thus, such a progressive rendering system will allow operation on platforms having various available processing power for image processing, while yielding acceptable results on systems having a low amount of available processing power.

It is not always possible to adjust the size and placement of an image mask for each user of the system. Thus, the preferred embodiment provides a background image which is tolerant of misalignments and misadjustments of the video image with the background image. In the case of a masked character background image, this tolerance includes providing an edge portion of the mask which merges appropriately with a variety of types of facial images, e.g., men, women, children, and possibly pet animals.

Because the system is not limited to a chroma key superposition system, the information from the position sensor and the video camera allow simple extraction of the image of an individual's face in a more generalized computer graphic image, based on an estimate of its position. Thus, multiple individuals may be presented in a single graphic image, each interacting with his or her environment or with each other. While these individuals may be present in the same environment, for example, within the field of view of a single video camera, this ability to build complex images from multiple inputs allow individuals at remote locations within a computer network to interact while viewing each other's faces. Therefore, personalized multiplayer "video" games become possible. This same technology my also have uses outside the fields of entertainment, including communications and video conferencing. This personalized representation separated from its native background also forms the basis for a new style of multi-user graphic interface system.

In implementation, the position estimation system preferably acts as an input to a computer generated animation as the background image figure. In one set of embodiments, the generation of the resulting combined image is performed through a chroma key system. Therefore, in such systems, the background figure image is provided with a key color in a facial region or desired superposed video image region(s) of the figure. In contrast to typical applications of chroma key technology, the chroma key appears in the presented background, with the live video image overlayed in the chroma key region. Of course, chroma key technology is not the only method for combining the various image information, and in fact the process may be performed digitally in a computerized system.

In one embodiment, the position sensor defines a predefined window, which is translated around the video space. Where further refinement is desired, the orientation and distance of the foreground object from the video camera may be compensated. The shape of the window may be a regular shape or an outline of a foreground image. Thus, with an image of a person as the foreground image, the image may be initially processed to determine the shape. Thereafter, the shape may be translated, resized or otherwise transformed as the window. In this latter case, the shape of the window may be periodically redetennined, but need not be recalculated in real time.

In a particularly preferred embodiment, the live video image is an image of a person having a face, with a position sensor mounted on top of a set of headphones. An oval mask region is defined with respect to the position sensor, so that the position of the face within the video image is predicted to be within the oval mask region. The position sensor also serves as an input to a computer animation graphic image generator, which generates an animated body in appropriate position and orientation for combining with the face. Further position sensors may be provided on the arms of the person, as further inputs to the computer animation graphic image generator, allowing further control over the resulting image. The computer animation graphic image includes a chroma key portion in a region intended for the facial image. The live video image is then merged with the computer animation graphic image and presented as a composite.

The position tracking system is, for example, an Ascension position tracking system mounted centrally on a bridging portion on a set of headphones, worn by a person. The person is present within the image of a video camera, and the system calibrated to locate the position tracking system unit within the field of view of the video camera. The face of the person is estimated to be within an oval area approximately 10 inches down and 8 inches wide below the position tracking system sensor, when the person is facing the camera. Since the preferred position tracking sensor senses movement in six degrees of freedom, the window is altered to correspond to the expected area of presentation of the face in the image. The border between the live video image of the face and the animated character need not be presented as a simple oval region, and may include images which overlay the face, as well as complex boundaries.

By employing a separate position tracking sensor, the preferred embodiment avoids the need for sophisticated image analysis, thereby allowing relatively simple and available components. Further, known types of position sensors also provide orientation information which may be useful for providing control inputs into the background image generation system and also to control the position and shape of the mask region to compensate for skew, profile, tilting and other degrees of freedom of the object. The computer generated animated image responds to the position tracking sensor as an input, allowing the animation to track the movements of the person.

While one preferred embodiment employs an Ascension tracking system, which, while of high quality, is also expensive, another preferred embodiment employs an acoustic sensor to determine location in three or more dimensions. This system is similar to the known "power glove" accessory for video games. Other types of position sensors may also be used.

Thus, the present invention avoids the need for a defined background for a foreground image when electronically superimposing video images by providing a position sensor to provide information for determining a location of the desired foreground image in a foreground video stream. The position sensor thus minimizes the need for analysis of the foreground image stream, allowing relatively simple merging of the video streams.

In systems where the facial image is captured and electronically processed, rather than genlocked and superimposed, the use of the position sensor to define a mask region in the video image substantially reduces a computational complexity required to extract a facial portion from a video image, especially as compared to a typical digital image processing system. As noted above, the margin of the face need not be determined with high precision in many instances, and therefore the background image which is generated to surround the facial image may be provided to include a degree of tolerance to this imprecision, such as a wide edge margin and avoidance of structures which should be precisely aligned with facial features. Where the image is to be transmitted over a computer image, and where the facial portion of the image is the most important component of the image, the use of the present system allows transmission of the masked portion of the image only, reducing the amount of information which must be transmitted and thus compressing the image data.

A known paradigm for user interaction with computers is known as an "Avatar", a computer generated representation of a user, which is generally wholly animated. These Avatars may be transmitted through a computer network system, for example the Internet, to allow a user to interact with a graphical environment of a system. According to the present invention, these Avatars need not be completely computer generated, and may therefore include a real time video image of a face. This system therefore allows, with reduced computational requirements and limited bandwidth requirements, the personalization of Avatars. Thus, the present invention provides a new type of graphical user interface in which a user is represented as an actual image within a computer graphic space. Multiple users may therefore interact while viewing actual images of each other, even where the users are separated over nodes of a computer network.

As stated above, an in-band mask region determining system may operate based on the foreground video input device. Thus, the position sensing system need not include physically separate hardware. Likewise, the video signal superposition system need not be an external chroma key superposition system, and may be integrated with the animation generation system In a first image analysis embodiment, an outline of a major foreground object is determined, and the outline used to define a mask. In a second image analysis embodiment, the foreground object is irradiated with an unobtrusive radiation, e.g., infrared, which is detected by a special video camera or optical sensors. Thus, the infrared contrast of the foreground image defines the foreground object, and a corresponding mask provided. In a third embodiment, an optical transmitter, e.g., one or more LEDs, preferably including a blue LED, is mounted on the headphones, visible to the video camera. The presence of an illuminated spot is detected, and a mask defined in relation to the position of the spot. If distance and orientation information are desired, a plurality of LEDs may be mounted, in a configuration sufficient to allow estimation of position and orientation. Thus, it can be seen that the position detecting system may operate through the video feed without requiring rigorous image analysis, which often cannot be performed in or near real time.

The resulting image of the method according to the present system and method may be presented on a video monitor, transmitted over a video network for rendering at a remote site, or stored on a video storage medium, such as video tape. In the latter case, the opportunities for complex background generation become apparent. Where the image is not simply transient, a higher level of detail in the background image may be preferred, because the stored image may be reviewed a number of times. Further, since the background is computer generated, it need not be constant. Thus, for example, the foreground image and control signals, e.g., position and orientation signals, may be stored on a CD-ROM, with the background image generated in real time on reproduction of the images on a computer system. Since the video image and the control parameters are stored, the reproduced image sequence need not be fixed, and may therefore vary based on a set of background parameters.

An alternative set of embodiments provide different processing systems to capture the facial image presentation. For example, the location of the image of the face may be identified, with the facial image texture mapped onto a computer generated image. Thus, the boundary between the foreground image and background image need not be a discrete edge, and the present invention therefore allows a more subtle merging of the images.

The location of the foreground image need not be determined with a typical position sensor, and other systems may be used. Advantageously, the focal plane of the foreground object, e.g., person, differs from the background. In this case, the boundary of the foreground object may be determined by detecting a focal plane boundary. This technique offers two advantages. First, it allows redundant use of the focus control system found in many video camera systems, eliminating the need for a separate position sensing system. Second, it allows imaging of irregular-shaped objects, e.g., a person wearing a hat, without being limited by a predefined mask shape.

A rangefinder system may be used to obtain a depth map of a face in realtime, with the resulting data used as control parameters for a computer generated character's face. This rangefinder information allows use of facial expression as a control input, while reducing the need for strict image analysis. This depth information may also be employed to assist in texture mapping the video image information on the background. Likewise, other objects or images may be tracked and used as control inputs.

It is noted that, while many embodiments according to the present invention employ a computer generated graphic image, the background image need not be computer generated. Thus, the background image may also represent a video feed signal. In one embodiment, the background image is a video image of a robot or computer automated mechanical structure, which, e.g., responds to the position and orientation inputs from the foreground input to provide coordination. The merging or foreground and background images in this case may be through the use of typical chroma key technology.

It is thus an object of the present invention to provide a graphic image system comprising a source of a first signal representing a first image including a moving human subject having a head with a face; an image position estimating system for estimating the instantaneous position of said head of said human subject; a source of a second signal representing a second image including a character having a head with a mask outline; and means, responsive to said position estimating system and to said first and second signals, for dynamically defining an estimated boundary of said face of said human subject in said first image and for merging the face in said first image, as limited by said estimated boundary, with the second image within the mask outline.

It is also an object of the invention to provide a video system comprising a video input, receiving a video signal representing an image having a movable foreground object; a position tracking system for tracking a position of said movable foreground object; and means, responsive to said position tracking system, for dynamically defining an estimated boundary of said moveable foreground object in said image.

It is a further object to provide a video system having ground video image and a video superposition control for superposing the foreground object of said image within said estimated boundary on said background video image.

It is a still further object of the invention to provide a video system wherein said background video image is responsive to said position tracing system.

It is another object of the invention to provide a video superposition control having a chroma key video superposition unit. The background video image preferably comprises a computer generated animated image stream.

According to various objects of the invention, the position tracking system may be a radio frequency field sensor, an electro-acoustic transducer or an optical position sensing system The position tracking system may have various degrees of freedom, for example two, three or six The position tracking system may include a physical transducer mounted on the foreground object.

According to the present invention, the mask or estimated boundary may be geometric in shape, for example oval, round or having multiple discontinuous geometric segments.

The position tracking system produces a position, and optionally orientation of the foreground object within the field of view of the video camera.

According to another object of the invention, the position tracking sensor determines a position and orientation of the foreground object, and is used to control a size, shape and position of the mask region.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENTS

Figure 1:
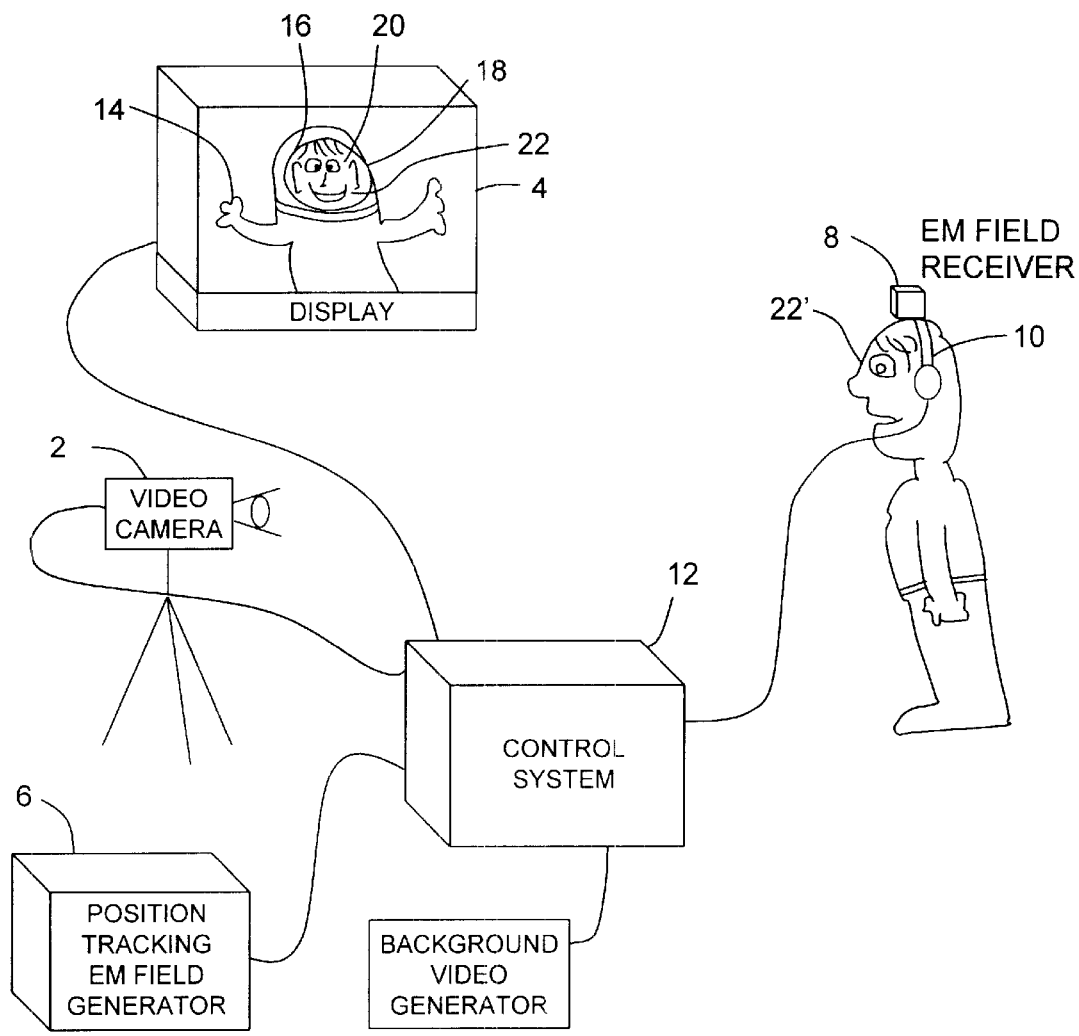
FIG. 1 shows a perspective view of a first embodiment of the invention, having an electromagnetic position tracking device.

The invention will now be described by way of the drawings, in which corresponding reference numerals indicate corresponding structures in the figures.

EXAMPLE 1

As shown in FIG. 1, a video camera 2 is positioned near a video display 4, which may be, for example, a rear projection video monitor. An electromagnetic transmitting antenna 6 is positioned within the environment, producing a time-varying magnetic field which is detected by a sensor 8. The antenna 6 produces a field which has a characteristic spatial variation, so that the sensor 8 allows detection of the position and orientation of the sensor 8 with respect to the antenna 6. The sensor 8 is mounted at the apex of the bridging portion of a set of headphones 10. The position and orientation of the sensor 8 is calibrated. A computer 12 receives the position sensor 8 output, and is used to generate an animated graphic image 14 on the monitor 4. The animation responds to the position sensor 8 as an input, for example performing corresponding changes in orientation and position. The animated figure of the graphic image 14 has a facial area 16 which is rendered in a deep blue color, having a border 18 which may be mask-like. The video image is optionally justified based on the output of the position sensor. A window 20 is generated in the video graphic image 14 at the expected location of the face 22 based on the position sensor 8 position and orientation The window 20 with the face 22 image is then displayed, using a chroma key circuit keyed to the deep blue color, in the position of the mask.

Thus, with a fixed relation of the antenna 6 with respect to the video camera 2, the sensor 8 may be used to control animation with a portion of a live video image superimposed on a computer generated graphic image 14, responding to a motion of an object in the live video image. By adaptively masking the live video image based on a determined location within the imaging space of the video camera, without requiring a special background type, and without intrusion of stray objects in the video image into the resulting composite image.

EXAMPLE 2

Figure 2:
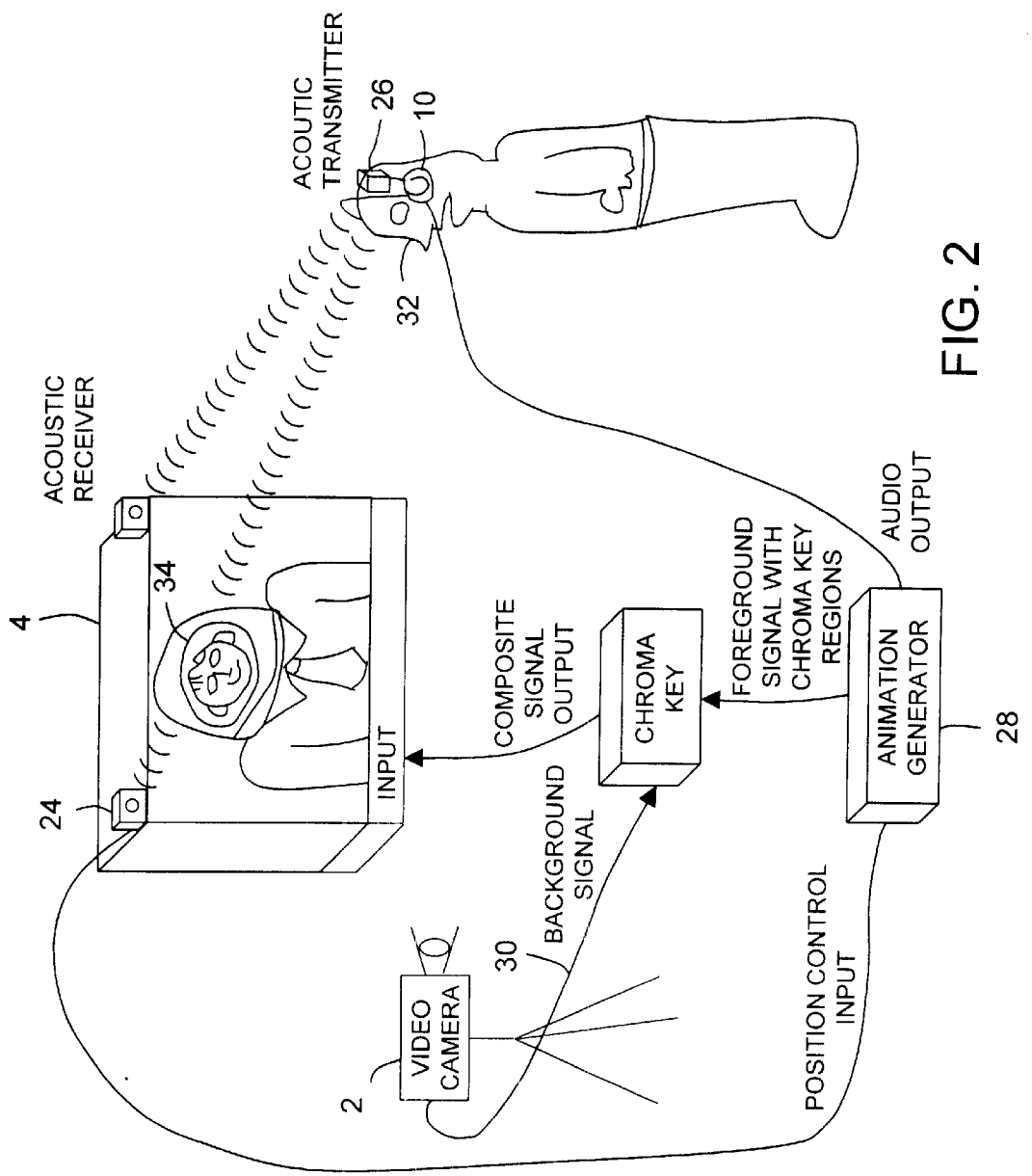
FIG. 2 shows a perspective view of a second embodiment of the invention, having an acoustic position tracking device.

In a second embodiment, as shown in FIG. 2, a simpler type of image position sensing system is employed in the system generally according to the description of FIG. 1. In this case, the position sensor 24, 26 is sensitive to position, but not orientation, and further has a limited range. In this case, the computer system 28 presumes that the live video image 30 includes an image of a person 32 looking directly at the video camera 2, so that the position of the mask 34 in the video image 30 is altered. While this presents reduced opportunity for animation control, variations in position may be used, within the range of the display 4. Thus, the strategy of use of the position sensor may differ.

The system according to the second embodiment has another type of application. In a video conferencing system, often a distracting background is present, which further increases a required bandwidth to transmit a compressed image. Therefore, by determining the position of the head of a video conference participant, the head may be selectively processed. While headphones are not required in this application, in situations with distracting backgrounds, often there is also stray noise, so that the headphones may be desirable. The acoustic position sensing system 24, 26 operates on a triangulation technique. The position sensor element 26 mounted on the headphones 10 in this instance is an ultrasonic transmitter. By detecting a differential amplitude, as well as phase delay, in a fixed receiver 24 location, a position of the transmitter 26 in space may be determined.

EXAMPLE 3

Figure 3:
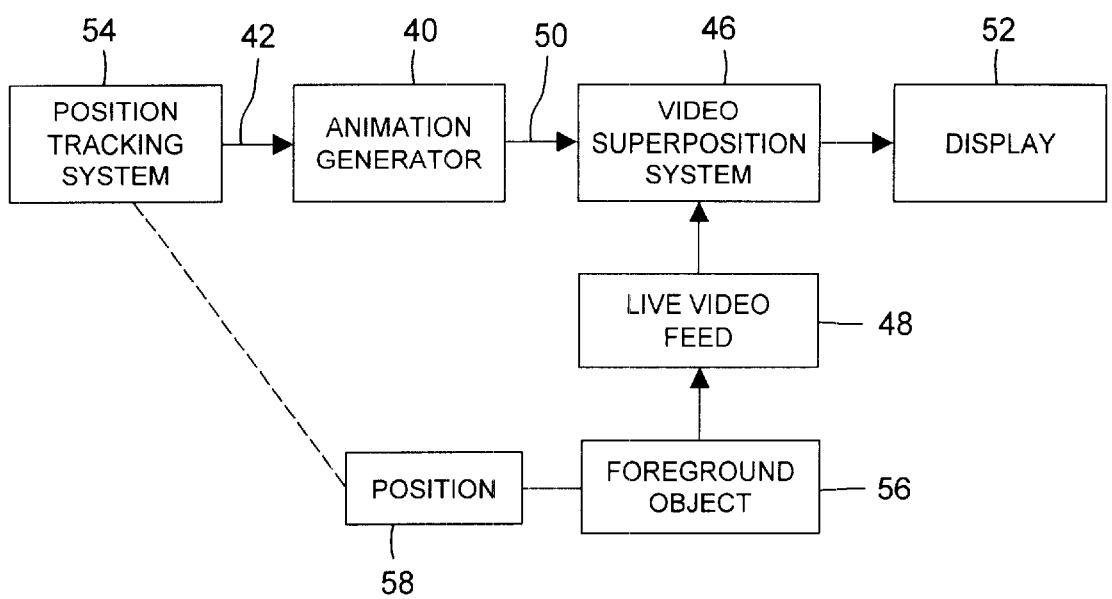
FIG. 3 shows a block diagram of a system according to the present invention.

FIG. 3 shows a configuration of the electronics hardware according to one embodiment according to the present invention. The system animation 40 receives a position input signal 42 from a position tracking system 54 which is used to determine a mask position within the live video feed 48 of a foreground object 56 and also as a control parameter for a computer generated animation. Other control inputs may also be received, such as arm or wrist position, joysticks, or other known input devices. The live video 48 mask is then overlayed in a chroma key unit 46 over a computer animated image 50 and diplayed on a monitor 52. It is noted that completely digital processing of the image may also be used. However, the chroma key technology requires a reduced computational load and may potentially be implemented with lower cost. Since the mask location, as determined by a position transducer 58, may change within the live video 48 image, the mask image may optionally be translated to a desired location within the composite image.

EXAMPLE 4

Figure 4:
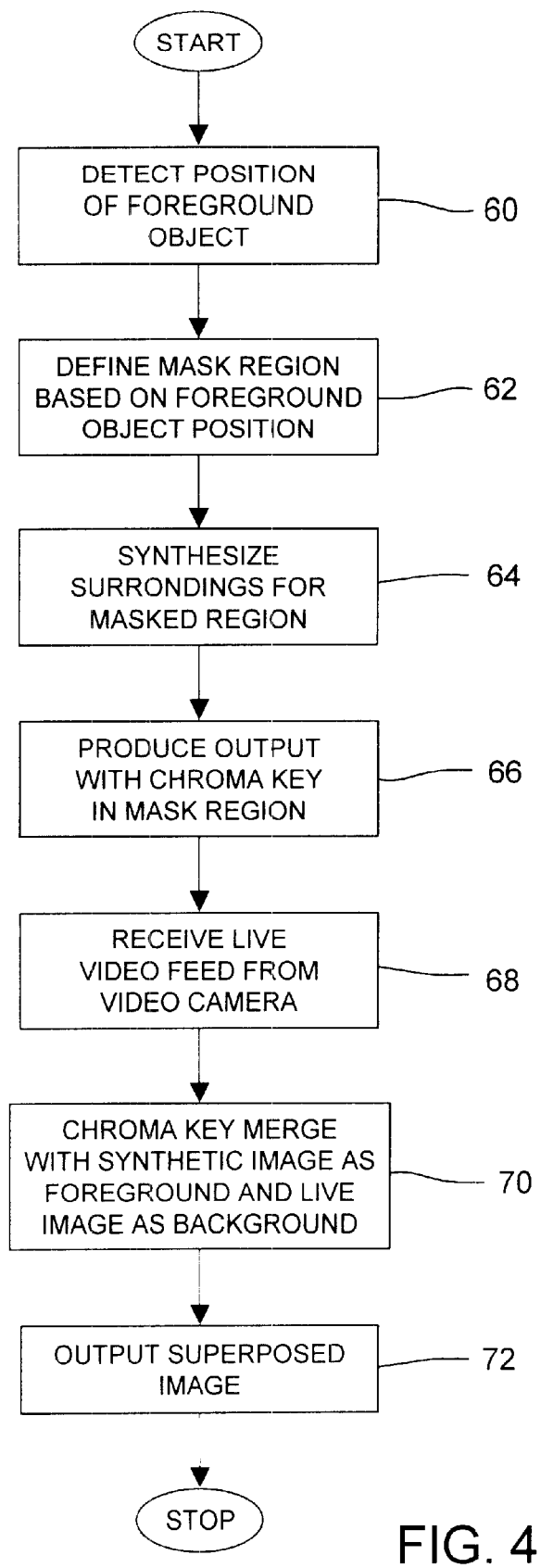
FIG. 4 shows a flow chart of a method according to the present invention.

FIG. 4 shows a flow diagram of a method according to the present invention. The position of the position sensor is calibrated with respect to the live video image 68. A person wears the headphones. A mask location is defined 62 in the live video image by determining the position of the position sensor 60. The output of the position sensor is also used to control animation 64, generally to produce a character who moves corresponding to the movements of the position sensor. The face of the animated character is rendered in a chroma key color 66. A separate chroma key unit receives the animated image and the live video image, with the live video corresponding to the mask portion overlayed where the chroma key is active 70. The superposed image is then output 72.

EXAMPLE 5

Figure 5:
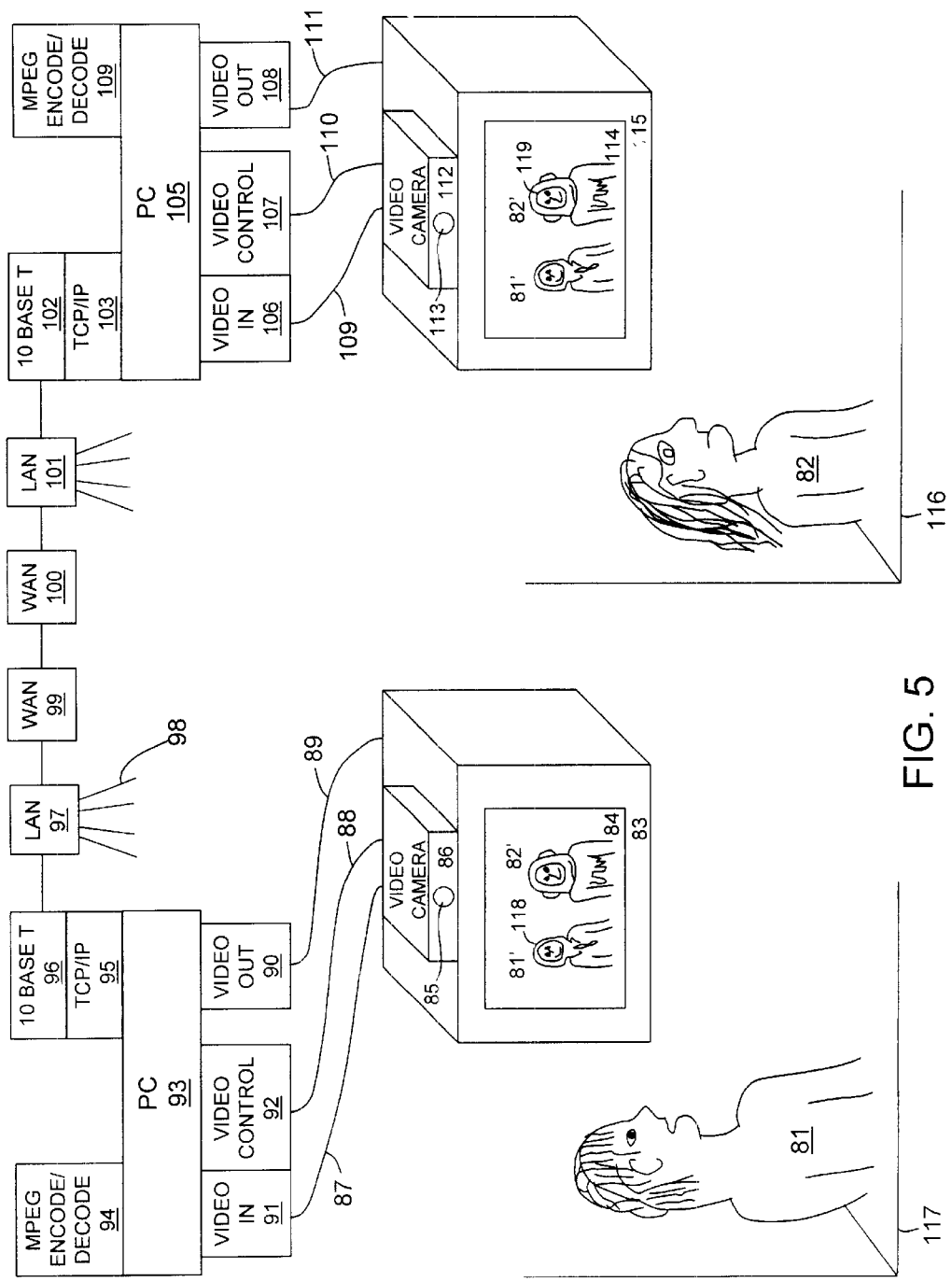
FIG. 5 shows a multi-user networked embodiment according to the present invention.

An embodiment of the invention is provided as shown in FIG. 5. A plurality of users 81, 82 interact with a computer network system through various nodes. The communication protocol is, for example, TCP/IP over Ethernet 10BaseT. Thus, a typical user station includes a personal computer (PC) 93, 105 running a graphical user interface, e.g., Windows NT or Solaris. The personal computer 93, 105 includes a number of adapter cards or functional interfaces. Each computer generally includes a video display adapter 90, 108, a frame grabber 91, 106, a control for a video camera 92, 107, and optionally a hardware MPEG encoder/decoder system 94, 109. The video compression and decompression may also be implemented on the host personal computer 93, 105. The personal computers communicate with each other over Ethernet 10BaseT networks 96, 102, using TCP/IP protocol. Therefore, each personal computer 93, 105 includes a TCP/IP stack 95, 103, which is generally a software construct. The computer network includes, for example, LAN hubs 97, 101 and WAN routers or bridges 99, 100.

Each user has a video camera 86, 112 mounted centrally over a video monitor 83, 115. The video camera 86, 112 control 92, 107 allows control over video camera parameters, including lens 113, 85 focus and zoom. In this case, the video camera 86, 112 intermittently scans through the various focal planes of objects within its field of view, with an edge contrast determination algorithm operative to determine optimum focus for any region. This edge contrast determination algorithm may be a predetermined program within the personal computer 93, 105. The optimum focus edge serves as a mask region 118 for the user's 81 head, and mask region 119 for user's 82 head, situated in front of the monitor 93, 115. The area within the mask regions 118, 119 are retained, while outside the mask regions 118, 119 are masked. The outline and position of the mask regions 118, 119 serve as control parameters for an Avatar 81', 82', which may be transmitted as necessary through the computer network, along with a compressed representation of the image within the mask regions 118, 119. The Avatar 81', 82' need not be presented identically on each display, and therefore may have distinct interaction at each local site.

Suitable compression for this image may include JPEG, MPEG, R320, H.324, H261, GIF, wavelet and fractal image compression, as well as other known compression formats. Where suitable MPEG encoder/decoder system 94, 109 is available, MPEG is preferred because of its bandwidth efficiency. The Avatars 81', 82' then form a part of a network graphic user interface, in which users 81, 82 act and interact within the computer environment space 84, 114 through graphic representations having personalized and real time varying facial expressions. This personalized interface system may reduce stress for novice users and provides an efficient and innate means of communication for people within the network.

By providing background 117, 116 masking for the foreground image, the personalized Avatar 81', 82' generation is simplified and the data transmission requirements are reduced.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the fill scope of the invention should be ascertained by the appended claims.

What is claimed is:

1. A graphic image system comprising:
   a source of a first video signal representing a first image including a moving human subject having a head with a face;
   an image position estimating system for estimating the instantaneous position of said head of said human subject;
   a source of a second signal representing a second image including a character having a head with a mask outline, wherein said mask outline moves in response to the instantaneous position of said head in said first image; and
   means, responsive to said position estimating system and to said first and second signals, for dynamically defining an estimated boundary of said face of said human subject in said first image and for merging the face in said first image, as limited by said estimated boundary, with the second image within the mask outline to generate a third signal representing an animated avatar having said face presented in said mask outline.

2. The graphic image system according to claim 1, said means comprising a video superposition control for superposing said face within said estimated boundary.

3. The graphic image system according to claim 2, wherein said mask outline in said second image is responsive to said image position estimating system.

4. The graphic image system according to claim 2, wherein said video superposition control comprises a chroma key video superposition unit.

5. The graphic image system according to claim 3, wherein said second image comprises a computer generated animated image stream.

6. The graphic image system according to claim 5, wherein said computer generated animated image stream includes a color keyed portion in a position corresponding to said estimated boundary.

7. The graphic image system according to claim 1, wherein said image position estimating system comprises a radio frequency field sensor.

8. The graphic image system according to claim 1, wherein said image position estimating system comprises an electro-acoustic transducer.

9. The graphic image system according to claim 1, wherein said image position estimating system comprises an optical position sensing system.

10. The graphic image system according to claim 1, wherein said estimated boundary comprises a geometric shape.

11. The graphic image system according to claim 1, wherein said image position estimating system comprises a physical transducer mounted proximate to said head, said first signal being received from a video camera viewing said human subject.

12. The graphic image system according to claim 11, wherein said video signal is received from a video camera, said video camera having a field of view, said estimated boundary being located at a position relative to a projection of said physical transducer in said field of view of said video camera.

13. The graphic image system according to claim 12, wherein said estimated boundary varies based on an orientation of said head.

14. The graphic image system according to claim 1, wherein said image position estimating system senses position along at least two axes.

15. The graphic image system according to claim 1, wherein said image position estimating system senses position along at least three axes.

16. The graphic image system according to claim 1, wherein said image position estimating g system senses position along at least six axes.

17. The graphic image system according to claim 1, wherein said image position estimating system dynamically tracks a position of the head of the human subject.

18. The graphic image system according to claim 1, wherein said mask outline in said second image is surrounded by an image of a head.

19. The graphic image system according to claim 1, wherein said first image includes said face and a remainder portion of said human subject, further comprising a telecommunication system for transmitting an image of said face substantially without said remainder portion.

20. The graphic image system according to claim 1, wherein said first image includes said face and a remainder portion of said human subject, further comprising a display for displaying said face substantially without said remainder portion.

21. The graphic image system according to claim 1, further comprising a plurality of first signals, each representing a first image including a moving human subject having a head with a face and a remainder portion of said human subject; and an output for outputting said faces of said plurality of first images substantially without said remainder portion.

22. The graphic image system according to claim 1, wherein said first video signal has a frame rate sufficient to show animation of said moving human subject.

23. The graphic image system according to claim 1, wherein the position estimating system further estimates the instantaneous orientation of said head of said human subject; and said mask outline in said second image is oriented based on the instantaneous orientation of said head in said first image.

24. A method for personalizing an avatar, comprising steps for:

generating a video image of a moving person having a head with a face;

sensing and tracking a position of the moving person's face in the video image;

generating a mask portion image including a face;

generating a background image including an animated avatar having a face position portion that moves within the background image in response to the tracked position of the moving person's face in the video image; and generating a superimposed image having the mask portion image including the face overlaid on the background image in the responsively moving face position portion of the animated avatar.

25. A method for personalizing an avatar as defined in claim 24, wherein the video image of the person is a live video image.

26. A method for personalizing an avatar as defined in claim 24, wherein:

the step of sensing the position of the person's face in the video image includes sensing the orientation of the person's face in the video image; and the step of generating a background image including an animated avatar having a face position portion includes orienting the face position portion within the background image based on the person's face orientation in the video image.

27. A method for personalizing an avatar as defined in claim 24, wherein the face in the mask portion image is based on the moving person's face.

28. A method for personalizing an avatar as defined in claim 24, wherein the face in the mask portion image is generated from the video image of the moving person.

29. A method for representing multiple moving individuals, each located at a respective remote location, as personalized avatars within displayed video images, comprising steps for:

generating video images, each video image associated with one of the multiple individuals at the respective remote locations, and each individual having a head with a face;

sensing and tracking a position of each individual's face in the respective video image;

generating respective a mask portion image that includes the respective individual's face;

generating a background image at each remote location, each background image including animated avatars, each animated avatar corresponding to a respective individual and having a face position portion that moves within the background image in response to the moving individual's tracked face position in the respective video image;

providing the respective mask portion images and tracked face positions to the respective remote locations over a network; and generating a superimposed image at each of the respective remote locations, each superimposed image having the mask portion images overlaid in the respective responsively moving face position portions of the animated avatars.

30. A method for representing multiple individuals as personalized avatars within displayed video images as defined in claim 29, wherein each video image associated with one of the multiple individuals at the respective remote locations is a live video image.

31. A method for representing multiple individuals as personalized avatars within video images as defined in claim 29, wherein:

the step of sensing the position of the individual's face in the respective video image includes sensing the orientation of the individual's face in the video image; and the step of generating a background image including animated avatars each having a face position portion includes orienting the respective face position portion in the background image based on the corresponding individual's face orientation in the video image.

* * * * *